Figure 1A:
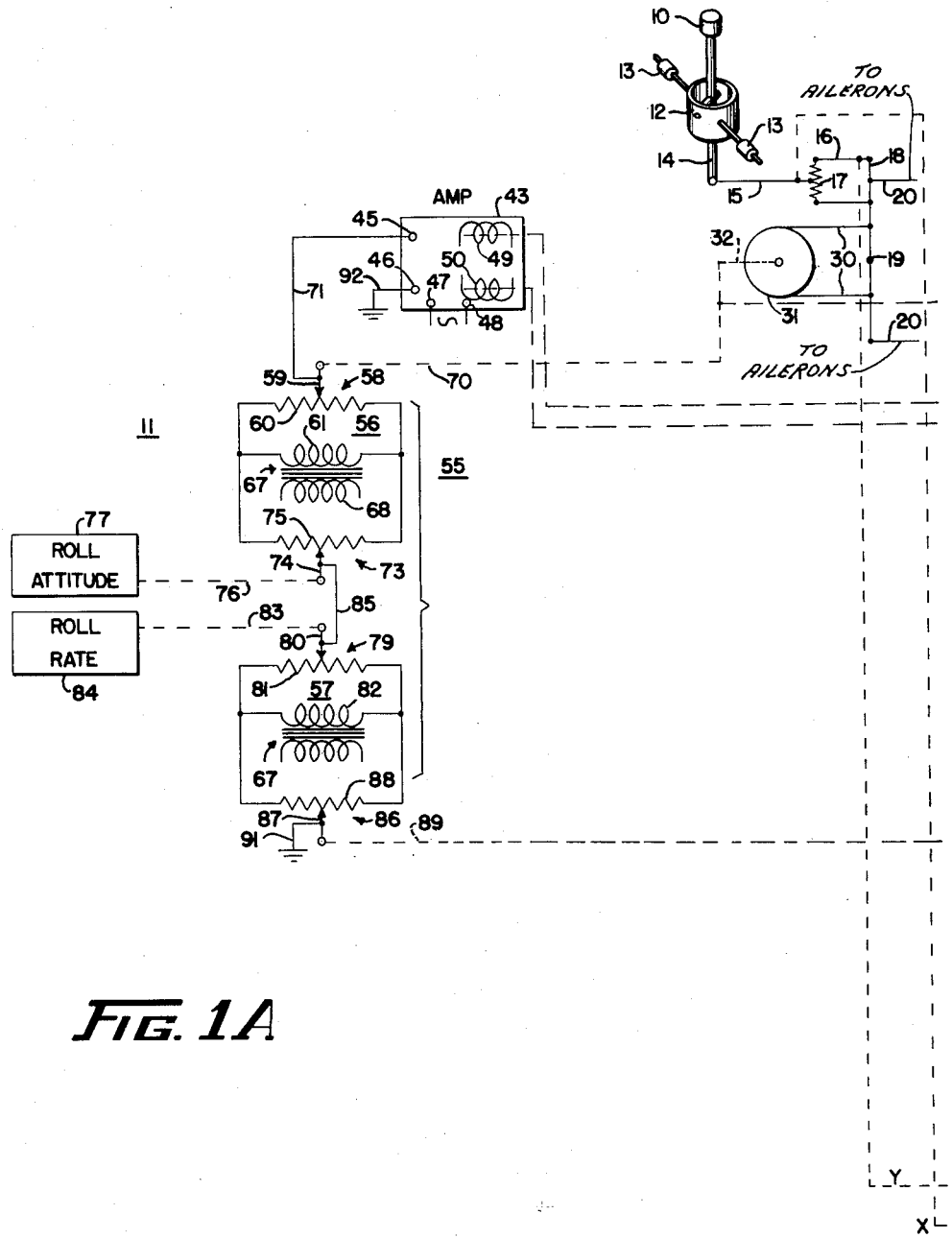

Feb. 7, 1961 C. E. VOGEL 2,971,144
INTERRELATED MANUAL AND AUTOPILOT SERVOSYSTEM
Filed Aug. 29, 1955 2 Sheets-Sheet 1

INVENTOR.
CLARENCE E. VOGEL
BY *Gordon Reed*

ATTORNEY

Feb. 7, 1961  C. E. VOGEL  2,971,144
INTERRELATED MANUAL AND AUTOPILOT SERVOSYSTEM
Filed Aug. 29, 1955  2 Sheets-Sheet 2

INVENTOR.
CLARENCE E. VOGEL
BY *Gordon Reed*
ATTORNEY

United States Patent Office 2,971,144
Patented Feb. 7, 1961

2,971,144

INTERRELATED MANUAL AND AUTOPILOT SERVOSYSTEM

Clarence E. Vogel, Minneapolis, Minn., assignor to Minneapolis-Honeywell Regulator Company, Minneapolis, Minn., a corporation of Delaware Filed Aug. 29, 1955, Ser. No. 530,998

16 Claims. (Cl. 318—489)

The present invention relates to control systems and more particularly to control systems of the type wherein a controlled object for controlling a condition is positioned, in accordance with the operation of a control device, by a servomotor. The invention is especially useful in power boost and automatic pilot systems for dirigible crafts such as aircraft and wherein such systems may be of the "parallel type." In a "parallel system," there is generally a direct mechanical coupling between the conventional control column of the aircraft and the autopilot servomotor that controls craft tilt as when a servomotor cable drum has secondary cables extending therefrom which are fastened to the main control cables leading from the control column to the control surface so that operation of the servomotor and its cable drum to adjust the surface is reflected in the accompanying operation of the main control column. It may be desirable to provide a power boost arrangement controlled from the control column to position the control surface while the autopilot is providing no control and its servomotor would offer no substantial resistance to the operation of the control surface. While this arrangement would require a special boost servomotor I have determined that such boost servomotor may be dispensed with.

This is achieved in one object of this invention which is to provide a combined power boost and automatic pilot system for a dirigible craft in which the power boost and automatic pilot have a common servomotor for controlling craft attitude, thereby resulting in simplification and saving in weight, or wherein the autopilot servomotor can be used for boost or autopilot control.

A further object of this invention is to utilize in a "parallel system" the conventional control column of an aircraft to control an autopilot servomotor which controls the position of an attitude changing device on a dirigible craft while the autopilot is operatively disassociated from the servomotor.

A further object of this invention is to control an autopilot synchronizer (that synchronizes the autopilot to an existing aircraft position which is to be stabilized prior to application of automatic stabilization by the autopilot of the craft position), from the craft conventional control column after automatic stabilization is applied to alter the stabilized craft position.

A further object of this invention is to synchronize an autopilot to the attitude of an aircraft position which attitude is to be subsequently maintained by the operation automatically of a servomotor from the autopilot and controlling this servomotor during the synchronizing period from a conventional aircraft control column.

A further object of this invention is to provide in a power boost and automatic pilot system having a common servomotor an interlocking arrangement to prevent application of automatic pilot control of the craft while the craft is controlled from the boost or during extreme attitudes of the craft reflected by the operation of a control device in the autopilot system.

A further object of this invention is to provide a novel system by which servo control in a "parallel system" can be easily effected from the control stick of the aircraft.

It is a further object of the present invention to provide an improved boost and autopilot servo system having a common servomotor in which any force applied to a manual controller is transmitted to an elastic member whose yield is alternatively utilized to control the servomotor directly or control the servomotor indirectly through the automatic pilot.

Other objects and advantages of the invention will become apparent from the following description referring to the accompanying drawings setting forth one embodiment thereof.

Figure 1B:
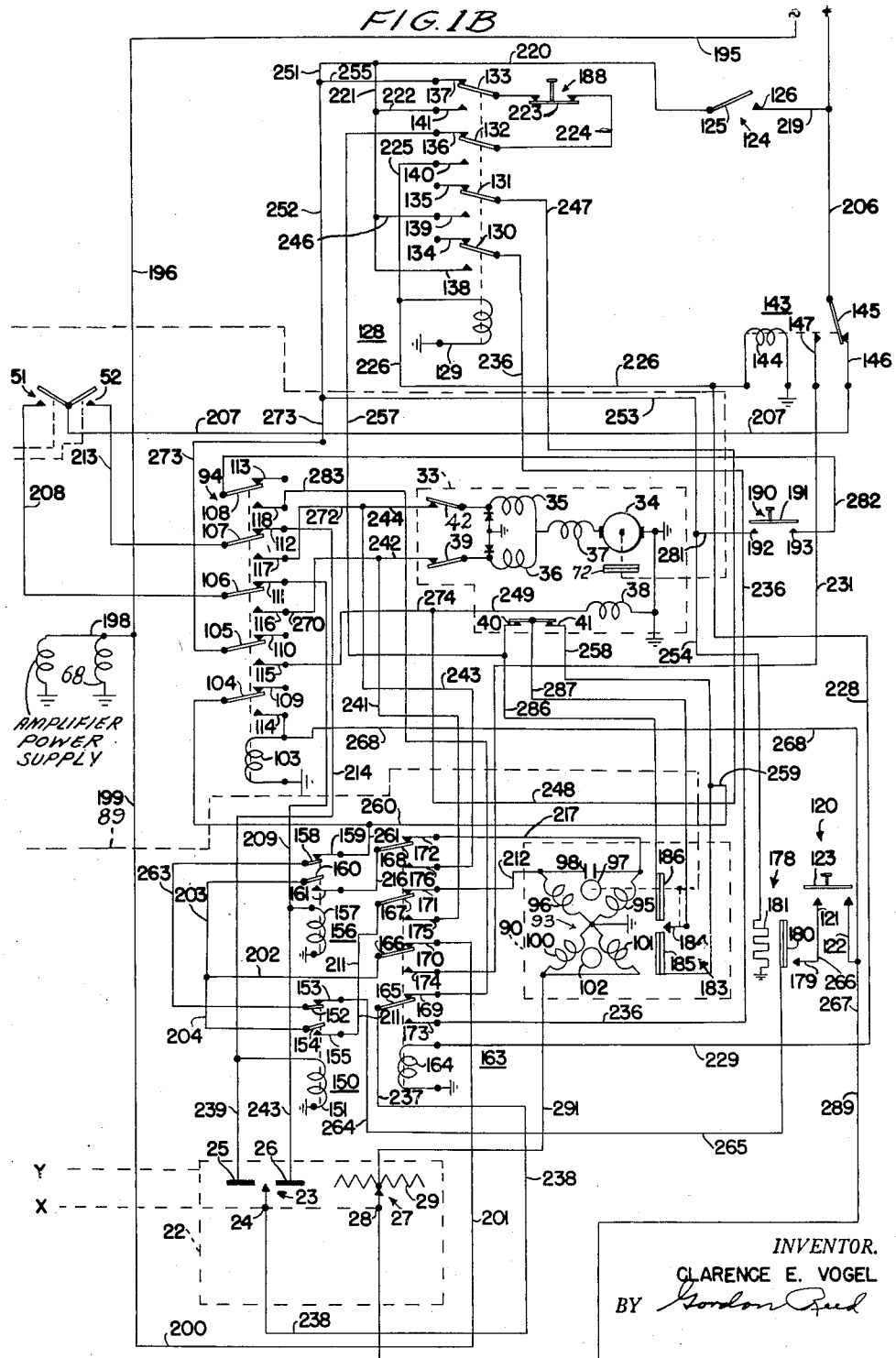

In the drawing:

Figures 1A and 1B together constitute a schematic circuit of the combination manual boost and autopilot control system.

Referring to Figure 1A which shows the source of control for the combination automatic and manual boost control system, the source of manual control is the conventional control stick 10 of the dirigible craft and the source of automatic control of the craft is an automatic pilot 11. The control stick 10 is supported in a cross gimbal arrangement 12 which in turn is supported in bearings 13, 13 fixed to the craft. The lower end 14 of the control column 10 is connected by means of a link 15 and elastic member 17 to a control member 16. The control member 16 is secured to a lever 18 pivoted at 19. Extending from lever 18 are cables 20, 20 connecting to devices for varying the attitude of an aircraft about an axis thereof such as aileron control surfaces (not shown) of an airplane.

Associated with the control column 10 is a base member 22 Figure 1B which supports elements of a single pole double throw switch 23 and elements of a variable resistance potentiometer 27. The switch 23 comprises an operable contactor 24 which coacts with opposed spaced contacts 25, 26. The potentiometer 27 comprises an operable slider 28 which is operable along a potentiometer resistor 29 in either direction from its center. The contactor 24 and the slider 28 are connected to the link 15 by an operating means X whereas the supporting member 22 is connected to the member 16 by an operating means Y so that when a control effort is applied to the control column 10 which may be resisted by a reactive force on the aileron control surfaces, the elastic member 17 permits a relative displacement of the link 15 and member 16 consequently the contactor 24 is displaced relative to its spaced contacts 25, 26 and the potentiometer slider 28 is displaced relative to potentiometer resistor 29. Upon release of the applied force to the control column 10 the elastic member 17 returns the link 15 and member 16 to a normal relative position. The function of the switch 23 and the potentiometer 27 will be clarified hereinafter.

The autopilot 11 comprises secondary cables 30 extending from a cable drum 31 and connected to the lever 18 on opposite sides of pivot 19. The arrangement is such that upon rotation of the cable drum 31 a motion is also applied to the control column 10. The elastic member 17 is of the type which will permit such transmission of motion from the operation of the drum 31 to the control column 10. Furthermore, the elastic member 17 will permit direct transmission of motion from the control column 10 to the lever 18 to permit direct operation of the craft's aileron control surfaces. The cable drum 31 is carried on an output shaft 32 of a servomotor 33, Figure 1B, having a rotor 34. The servomotor 33 may be of a known type and will be considered in detail in connection with Figure 1B. The servomotor 33 may be reversibly controlled from an alternating voltage discriminator amplifier 43 of known type, Figure 1A. The amplifier 43 may be of the electronic type and includes a pair of signal input terminals 45, 46 connected to the amplifier control electrodes and a pair of power input terminals 47, 48 connected internally to discriminator tubes and connected externally to an A.C. supply. The amplifier comprises a pair of relays 49, 50 which are alternatively energized depending upon the phase relationship of the signal input voltage across terminals 45, 46 relative to the voltage across power input terminals 47, 48.

The amplifier signal input terminals 45, 46 are connected to a balanceable network 55 comprising a servo-balance-roll attitude network 56 and a roll rate-trim network 57. The network 56 comprises a servo balance potentiometer 58, a roll attitude potentiometer 73 and a transformer 67. Potentiometer 58 comprises an operable slider 59 and resistor 60 which is connected across a secondary winding 61 of the transformer 67. The transformer includes a primary winding 68. Slider 59 is positioned along resistor 60 in either direction from the electrical center thereof by a suitable operating means 70 extending from the output shaft 32 of the servomotor. A conductor 71 connects amplifier terminal 45 and slider 59. Potentiometer 73 comprises a slider 74 and resistor 75 which is connected across the secondary winding 61 in parallel with resistor 60. The slider 74 is operated along resistor 75 in either direction from the electrical center thereof, having a potential the same as an electrical midpoint of winding 61, by a suitable operating means 76 operably connecting slider 74 to a roll attitude device 77. The roll attitude device 77 may be a conventional vertical gyroscope which positions slider 74 in either direction from the electrical center of resistor 75 in accordance with the direction of change in roll attitude of the craft and to an extent depending upon the magnitude of the roll angle from a normal attitude. Network 57 comprises a roll rate potentiometer 79 having a slider 80 and resistor 81, a trim potentiometer 86 having a slider 87 and resistor 88, and the transformer 67. Resistor 81 is connected across a secondary winding 82 of the transformer 67 which winding may have a common primary winding for supplying a plurality of secondary windings. Slider 80 is positioned along resistor 81 in either direction from the electrical center thereof by a suitable operating means 82 connecting it with a roll rate device 84 which may be a conventional rate gyroscope. A conductor 85 connects slider 74 with slider 80. Potentiometer resistor 88 is connected across the secondary winding 82 in parallel with the resistor 81. Slider 87 is positioned along resistor 88 in either direction from the electrical center thereof by suitable operating means 89 connecting it with a trim or centering motor 90. A ground conductor 91 extends from slider 87 and thereby completes a circuit to the ground conductor 92 connected to amplifier terminal 46.

Normally, the potentiometers sliders 59, 74, 80, and 87 are all at their electrical centers when the control circuit 55 of the amplifier is in a balanced condition. Upon unbalance of the control circuit, due to displacement of a slider, the amplifier 43 as shown in the art operates one or the other of its relays 49, 50.

During the time that the autopilot 11 is not utilized to control the attitude of the aircraft, the output of the amplifier 43 may be transmitted through a switching means 94 to the centering motor 90, as will be more evident from a consideration of Figure 1B, and the motor 90 operates slider 87 to rebalance the control circuit 55 to terminate operation of amplifier 43.

While the arrangement of Figure 1B indicates that the output from the amplifier 43 may be selectively applied through switching means 94 either to the centering motor 90 or to the servomotor 33, it is desirable in actual practice, as will be described in Figure 1B, to prevent the application of an amplifier output to the servomotor 33 until certain predetermined conditions exist. The operation of the switching means 94 is actually effected through an electrical circuit which includes various interlocks to prevent the operation of the switching means 94 except under specified conditions which will now be considered in connection with Figure 1B. Figure 1B shows the servomotor 33 and the trim motor 90 in detail. This figure also includes various other switches and relays which condition the operation of the switching means 94. These relays and switches will be described initially as components and their relationship will be brought out in a general overall discussion of the operation of the system. The servomotor 33 is of a D.C. energized type having an armature 34, alternatively energized field windings 35, 36, and a pulsing clutch winding 37. The armature 34 is connected to the output shaft 32 through a magnetic clutch 72 having a control winding 48. The servomotor includes a pair of limit switches 39, 42 which are operated alternatively when the armature 34 has rotated to extreme positions in either direction. The motor 33 also includes a further set of switches 40, 41 which are also alternatively operated in extreme positions of the motor 34. One circuit for energizing motor 33 extends from one limit switch 42 field winding 35, pulsing clutch winding 37, armature 34, to ground, and an alternative circuit extends from the other limit switch 39, field winding 36, pulsing clutch winding 37, armature 34, to ground.

The amplifier relays 49, 50 of Figure 1A operate respectively switches 51, 52, Figure 1B.

The trim motor 90 is an AC capacitor type induction motor comprising a pair of field windings 95, 96, a rotor 97, and a phasing capacitor 98. The rotor 97 is connected to and drives the operating means 89 for the trim potentiometer slider 87. As evident from the arrangement of the induction motor, one field winding 96 is directly energizable whereas the other winding 95 may be energized through the phasing capacitor 98 during direct energization of winding 96. The reverse energization of the two windings is also effected alternatively.

The switching means 94 is referred to herein as an aileron servomotor engage relay and is of the four pole double throw type. The relay includes an operating winding 103 along with operable arms 104, 105, 106, 107, and 108. Relay arms 104, 105, 106, 107, and 108 coact respectively with relay out contacts 109, 110, 111, 112, and 113 or with relay in contacts 114, 115, 116, 117, and 118 respectively.

The arrangement of Figure 1B includes the following additional components: a button type switch 120 for engaging the autopilot system, a master switch 124 which is of the single pole single throw type; a boost-autopilot manually operated solenoid held changeover switch 128 which is of the four pole double throw type; a boost-amplifier D.C. power changeover relay 143 which is of the single pole double throw type; a pair of boost-synchronizer-anti-engage relays 150, 156; a boost engage relay 163; a thermal delay switch 178; a motor operated sector switch 183; an autopilot disengage switch 188; and a manually operable button type trim switch 190. The engage switch 120 comprises a pair of contacts 121, 122 and a contact bridging element 123 normally spring biased to open circuit position. The master switch 124 comprises a single throw switch arm 125 and a coacting contact 126. The boost changeover switch 128 comprises an operating winding 129 and operable arms 130, 131, 132, 133. These arms engage respectively with out contacts 134, 135, 136, and 137 and with in contacts 138, 139, and 140, and 141 respectively. The boost-amplifier D.C. power changeover relay 143 comprises an operating winding 144 and an operable arm 145 which engages out contact 146 or in contact 147 alternatively. Relay 150 comprises an operating winding 151 and one operable arm 152 engaged with an out contact 153 and an operable arm 154 engageable with an in contact 155. Relay 156 comprises an operating winding 157 and an operable arm 158 engaging an out contact 159 and an operable arm 160 engageable with an in contact 161. Boost engage relay 163 comprises an operating winding 164 and operable arms 165, 166, 167, and 168 which engage respectively with out contacts 169, 170, 171, and 172 or with in contacts 173, 174, 175, and 176. Thermal delay switch 178 comprises a contact 179 and an operable arm 180 normally disassociated from the contact 179. The arm 180 is of thermal responsive material with heat therefore being supplied by a heater element 181. The switch 183 comprises an operable arm 184 and spaced contacts 185, 186. The switch arm 184 is operated by the trim motor 90 and engages one of the other of the spaced contacts at somewhat extreme displacement of the synchronizing or trim motor from a normal position which occurs when slider 87 is at the approximate center of resistor 88. The switch 188 is of normally closed momentarily opened type. The manual trim switch 190 is similar to switch 120 and includes a pair of spaced contacts 192, 193 and a contact bridging member 191 which is spring biased to open circuit position.

Operation

The arrangement provides for three types of operation: manual operation of the aircraft, boost operation, and autopilot operation. During manual operation, the master switch 124 is left in open position. Direct manual operation of the main control cables 20 is effected from the control stick 10 through the elastic member 17. The manual operation of the aircraft is normal except for a small amount of spring centered lost motion in the controls because of the elastic member 17. During direct manual operation of the control column 10 to position the control surfaces, A.C. from the supply is transmitted over conductor 195, conductor 196, conductor 198, to the primary winding of the transformer 67 to make available voltage to the networks 56, 57, and to energize the amplifier power supply. Additionally the energized conductor 198 may serve to energize the spin motors for the roll attitude gyroscope 77, the roll rate gyroscope 84 and necessary devices on the craft. The A.C. supply is also transmitted from energized conductor 196, conductor 199, conductor 200, conductor 201, boost engage relay out contact 170, relay arm 166, conductor 202, to conductors 203, 204 connected respectively to boost synchronizer relay arms 160 and 154.

Should the amplifier control circuit 55 Figure 1A be unbalanced resulting from the displacement of either slider 74 or 80, due to a change in craft attitude, one or the other of amplifier relays 49, 50 will be energized operating one or the other of their switches 51, 52, Figure 1B. When an amplifier relay thus operates, D.C. voltage is conducted from the D.C. supply, conductor 206, Figure 1B, relay arm 145, out contact 146 of the boost-amplifier D.C. power changeover relay, conductor 207, amplifier operated switch 51 (if operated) conductor 208, rudder engage relay arm 106, relay out contact 111, conductor 209, operating winding 157 of relay 156, to ground. On operation of relay 156, relay arm 160 engages relay in contact 161 to complete a circuit from energized conductor 203, relay arm 160, in contact 161, conductor 216, boost engage relay arm 168, relay out contact 172, conductor 217, directly through field winding 95 of trim motor 90 to ground and through phasing capacitor 98 and winding 96 to ground. Motor 90 operates to position slider 87 with respect to its resistor 88 until the control circuit 55 is in a balanced condition at which time operation of the amplifier 43 is terminated and amplifier operated switch 51 is moved to the open circuit position.

If the control circuit 55 had been unbalanced in such a direction as to cause the amplifier relay to close switch 52 a circuit would have been completed from energized conductor 207, closed switch 52, conductor 213, aileron engage relay arm 107, out contact 112, conductor 214, to operating winding 151 of relay 150 which causes relay arm 154 to engage contact 155. When this occurs, a circuit is completed from energized conductor 204, relay arm 154, in contact 155, conductor 211, boost engage relay arm 167, out contact 171, conductor 212, directly through winding 96 of motor 90 to ground and alternatively through condenser 98, motor winding 95 to ground. The motor 90 operates reversely at this time from that previously described to position slider 87 to rebalance the control circuit 55 thereby terminating operation of amplifier 43.

Boost operation

To initiate boost operation, switch 124 is closed and the switch arms 130, 131, 132, and 133 are manually moved to the down position in Figure 1B thereby establishing a circuit for switch holding coil 129 extending from D.C. supply conductor 206, conductor 219, master switch 124, conductor 220, conductor 221, conductor 222, switch contact 141, switch arm 133, conductor 223, disengage switch 188, conductor 224, switch arm 132, switch contact 140, conductor 225, holding coil winding 129 to ground. The changeover relay 143 is energized at this time by a circuit extending from energized conductor 224, switch arm 132, switch contact 140, conductor 225, conductor 226, relay operating winding 144, to ground. The winding 144 moves the relay arm 145 into engagement with contact 147 thereby severing the D.C. supply to the amplifier relay switches 51 and 52.

Operated in parallel or energized in parallel with the relay winding 144 is the disengage relay winding 164 through a circuit extending from energized conductor 226, conductor 228, conductor 229, winding 164 to ground. With the relays 143 and 163 operated, the D.C. supply is extended from energized conductor 206, relay arm 145, relay contact 147, conductor 231, boost engage relay in contact 174, relay arm 166, conductor 202, and through one path comprising conductor 203 to relay arm 160 and through an alternative path through conductor 204 to relay arm 154.

Closing of the manually operable switch 128 renders the operation of control stick force switch 23 effective by extending D.C. voltage from energized conductor 221, switch contact 138, switch arm 130, conductor 236, boost engage relay contact 173, relay arm 165, conductor 237, conductor 238, to control stick operated contactor 24. Upon deflection of the elastic member 17 due to operation of a control column 10, the contactor 24 engages contact 25 or 26. Upon contactor 24 engaging contact 25 a circuit is completed from energized conductor 238, conductor 24, contact 25, conductor 239, relay operating winding 151 to ground. With the operation of relay 150, a circuit is completed from the energized relay arm 154, in contact 155, conductor 211, relay arm 167, in contact 175, conductor 241, conductor 242, servo operable limit switch 39, servo motor winding 36, pulsing clutch winding 37, motor armature 34, to ground. As contactor 24 engaged contact 26, a circuit would have been extended from energized contactor 24, contact 26, conductor 243, relay operating winding 157, to ground, whereby the relay arm 160 would engage its in contact 161. A circuit would then have been completed from the energized relay arm 160, contact 161, conductor 216, boost engage relay arm 168, in contact 176, conductor 243, conductor 244, servo operable limit switch 42, motor winding 35, pulsing clutch winding 37, motor armature 34, to ground.

The energization of the servomotor would have resulted in the continuous operation of the aircraft control surface as long as the elastic member 17 was deflected from a normal position. During the above operation of the changeover, switch 128, the magnetic clutch winding 38 of the servomotor 33 for connecting the servo motor armature to the output shaft 32 is energized from a circuit extending from energized conductor 221, conductor 246, switch contact 139, switch arm 131, conductor 247, conductor 248, conductor 249, clutch winding 38, to ground. Thus as stated as long as pressure is applied between the manual control stick 10 and the arm 18, the servomotor 33 will be operated. The control surface however while being controlled by operation of the control stick 10 is positioned with less effort by the pilot.

*Autopilot operation*

To go from boost operation to autopilot operation, the boost can be disengaged by operating the changeover selector switch 128 to its upper position in Figure 1B thereby deenergizing changeover relay 143. The autopilot is engaged by energizing the engage relay or switching means 94. The engagement of the autopilot is initiated by closing the engage switch 120. The effectiveness of this operation of switch 120 is predicated upon the closing of the thermal delay switch 178. The thermal delay switch heater element 181 is energized from a circuit extending from energized conductor 220, conductor 251, conductor 252, conductor 253, conductor 254, switch heater element 181 to ground. After a small time interval, the thermal responsive switch arm 180 will engage its contact 179 thus completing the circuit for energizing winding 103 of the engage relay 94, the circuit comprising energized conductor 251, conductor 255, selector switch contact 137, selector switch arm 133, conductor 223, disengage switch 188, conductor 224, selector switch arm 132, contact 136, conductor 257, servomotor operated limit switches 40, 41, conductor 258, conductor 259, conductor 260, conductor 261, relay out contact 159, relay arm 158, conductor 263, relay arm 152, relay out contact 153, conductor 264, conductor 265, thermal delay switch arm 180, switch contact 179, conductor 266, engage switch contact 121, engage switch bridge member 123, switch contact 122, conductor 267, conductor 268, engage relay winding 103, to ground.

With the energization of the engage relay operating winding 103, the output of the amplifier 43 is diverted from controlling the trim motor 90 to controlling the servomotor 33. Should the amplifier 43 operate amplifier relay switch 51, the main servomotor 33 is energized from a circuit comprising energized conductor 206, boost-autopilot changeover relay arm 145, relay out contact 146, conductor 207, amplifier relay switch 51, conductor 208, engage relay arm 106, engage relay in contact 116, conductor 270, conductor 242, servo switch operated limit switch 39, motor winding 36, pulsing clutch winding 37, motor armature 34 to ground. If amplifier relay switch 52 had been operated alternatively, the servomotor would have been energized from a circuit extending from energized conductor 207, relay switch 52, conductor 213, relay arm 107, relay in contact 117, conductor 272, conductor 244, servomotor operated limit switch 42, field winding 35, pulsing clutch winding 37, motor armature 34 to ground. The operating winding for the magnetic clutch in the servomotor would have been energized from a circuit extending from energized conductor 252, conductor 273, engage relay arm 105, in contact 115, conductor 274, conductor 249, clutch operating winding 38, to ground.

During autopilot control, the craft may be maintained in a stabilized attitude with respect to its roll axis by response of the roll attitude device 77 to changes in attitude of the craft from a desired position. The device operating through network 55 and the autopilot, conventionally, to attain this result.

While the autopilot can stabilize the aircraft about its roll axis with respect to a given attitude, the attitude to which the craft will be stabilized may be varied by operating the pilot control stick 10. Manual changes in the attitude to be stabilized is effected by closing the trim switch 190 and operating the pilot control stick 10 with sufficient force to operate the contactor 24 into engagement with spaced contact 25 or spaced contact 26 thereby completing a circuit from energized conductor 253, conductor 281, trim switch 190, conductor 282, engage relay arm 108, in contact 118, conductor 283, boost engage relay contact 169, relay arm 165, conductor 237, conductor 238, force switch contactor 24, and alternatively to switch contact 25, conductor 239, boost synchronizer relay winding 151 to ground or switch contact 26, conductor 243, boost synchronizer relay winding 157 to ground. If the relay operating winding 151 be energized, the trim motor 90 is energized through a circuit comprising A.C. energized conductor 200, conductor 201, boost engage relay contact 170, relay arm 166, conductor 202, conductor 204, boost-synchronizing relay arm 154, in contact 155, conductor 211, boost engage relay arm 167, contact 171, conductor 212, directly through trim motor field winding 96 to ground and through condenser 98, motor field winding 95 to ground.

In operation synchronizing-trim motor 90 positions the slider 87 along resistor 88 unbalancing the network 57 and consequently unbalancing the control circuit or network 55 for amplifier 43. The amplifier in turn operates the main servomotor 33 to position the control surface. The control circuit 55 is rebalanced by the operation of the follow up arrangement 70 which positions slider 59 along resistor 60. The positioning of the control surface will alter the attitude of the craft. If relay operating winding 157 were energized, the trim motor 90 would have been energized to rotate in the reverse direction from that occurring with the energization of relay winding 151 described.

It will be noted that the trim motor drives a dynamic brake arrangement 93 which is energized from a D.C. source. Included in this circuit for energizing the brake is the variable potentiometer resistor 27 which has its resistance increased in accordance with the displacement of slider 28 relative to resistor 29 and consequently in proportion to the effort being applied to the control column 10. The circuit for energizing the dynamic brake comprises energized conductor 224, selector switch arm 132, switch contact 136, conductor 257, and alternatively "hard over switch" 40 or conductor 286, switch contact 186, synchronizing motor operated switch arm 184, conductor 287, thence hard over switch 41, conductor 258, conductor 259, conductor 260, aileron engage relay arm 104, relay in contact 114, conductor 268, conductor 267, conductor 289, conductor 290, variable resistor 27, conductor 291, through the windings 100, 101 of the dynamic brake to ground. The current developed in the rotor 102 of the dynamic brake in response to the rotation of the trim or synchronizing motor serves to damp the speed of operation of the trim motor 90. The damping effect will be decreased in accordance with the decreased current supplied to windings 100, 101 and thus in accordance with the amount of resistor in the energizing circuit for the dynamic brake. It is apparent that the resistance increases with increased effort on the pilot control stick 10.

It will also be evident that a holding circuit will have been provided for the operating winding 103 of the aileron engage relay 94 by energized conductor 259, conductor 260, relay arm 104, in contact 114, operating winding 103, to ground.

In the aileron engage relay circuit during autopilot control, it would appear that the continuity of the energizing circuit for the operating winding 103 depends upon the continuous closing of switches 40, 41. However, when on autopilot control if the control stick 10 has been operated to control motor 90 to call for a "hard over attitude" the servomotor 33 may have opened either switch 40 or 41 during the operation of the control surface to attain this attitude. However, since the attitude has been commanded by the control stick 10 a parallel circuit is provided about switches 40, 41 by the "hard over switch" 183 operated by the trim motor. Thus as long as the commanded change in attitude results in the opening of a servomotor "hard over switch" the autopilot will not disengage. However, should the ordered or commanded attitude be of opposite direction to that actually occurring by the operation of the motor 33 which operation opens switch 40, or 41 the engage circuit will be opened and the autopilot will be disengaged.

During conventional operation, the autopilot may be disengaged by the operation of the disengage switch 188. Also the autopilot may be disengaged by operating the selector switch 128 to the boost or down position in Figure 1B.

It will now be apparent that there has been provided a novel autopilot system for an aircraft which can be controlled through the conventional flight control column of the aircraft, wherein the system uses a parallel connection of the servomotor and such flight control stick. Furthermore in such system, the autopilot servomotor may be controlled from the control column during nonautopilot control of the aircraft, to provide a boost control.

What is claimed is:

1. Control apparatus for an aircraft having control column operated means for directly controlling craft attitude about a normally horizontal axis of the craft, said apparatus comprising: condition responsive means for detecting a change in a flight condition of the craft; servo means operatively connectable with said control column operated means for additionally controlling attitude and responsive to said condition responsive means for maintaining the craft in a selected flight condition; further means including an elastic connection constituting a part of said control column operated means and normally unactuated but actuable for operating the servo means for varying the condition to be maintained thereafter by said condition responsive means and servo means; and means for rendering the servo means nonresponsive to the condition responsive means in response to the connection of said further means to said servo means.

2. The apparatus of claim 1, and trim means to vary the control datum of the condition responsive means so that its datum conforms to the change of condition effected by said further means to trim the condition responsive means for the resumption of maintenance of a new condition.

3. The apparatus of claim 2, with additional means for controlling said trim means from said further means during response of said servo means to said condition responsive means.

4. Control apparatus for an aircraft having manually operable control column operated means for directly controlling craft attitude, said apparatus comprising: a servo motor; means for additionally operating said control column operated means from said servo motor; a servo motor control means including an operable elastic linkage interconnected with said control column operated means responsive to manual operation; craft position change detecting means connectable with said servomotor for maintaining a given craft position; selective means for alternatively connecting said servomotor control means or said detecting means with said servomotor for operation thereof; and trim means for preconditioning said position change detecting means for a new position of the craft resulting from operation of the servomotor by the servomotor control means.

5. Control apparatus for an aircraft comprising; position responsive means for detecting change in craft position; an amplifier having a control circuit operated by said position responsive means; a servo means selectively connectable to the output of said amplifier and operated thereby for maintaining the craft in a selected position; further means alternatively connectable to said servo means for alternative operation thereof for varying the position of the craft from that maintained by said position responsive means and servo means; and means for rendering the servo means nonresponsive to the amplifier in response to the connection of said further means and servo means.

6. The apparatus of claim 5, and trim means permanently in said amplifier control circuit but selectively connected to the output of said amplifier for operation thereby to vary the control datum of the position responsive means during change in craft position from said further means to trim the position responsive means for the resumption of maintenance of a new position.

7. The apparatus of claim 6, with additional means for controlling said trim means from said further means during response of said servo means to said amplifier.

8. In a control apparatus for an aircraft having a condition controlling object, a manually operable control device, and an elastic linkage interconnecting said condition controlling object and said control device, in combination: a servo motor adapted to be connected in nonyielding relation to the condition control object end of said elastic linkage; an electric signal generator connected to respond to elastic deformation of said linkage due to relative movements of its ends; condition responsive means for detecting change in a condition of the craft; a second electric signal generator operated by said condition responsive means; means for connecting said second signal generator to said servomotor for maintaining the craft in a selected condition or disconnecting it therefrom; further means for alternatively connecting and disconnecting for control purposes said first signal generator to said servomotor for operation of the servomotor for varying the condition maintained by said condition responsive means and said servomotor; and means for rendering the servomotor nonresponsive to the second signal generator in response to the connection of said first signal generator through said further means to said servomotor for control of said servomotor by the first signal generator.

9. The apparatus of claim 8, trim means to vary the control datum to which the condition responsive means and servomotor maintain the craft to trim the responsive means for the resumption of maintenance of a new condition and operated by said second signal generator; and means for additionally controlling said trim means from said first signal generator during response of said servomotor to said second signal generator.

10. In a control apparatus for operating a condition control device by an operable device and having an elastic member interconnecting said condition control device and operable device, in combination: servo means connectable in nonyielding relation to said condition control device for movement together; a condition responsive means; a signal generator operated by said responsive means; an amplifier connected to said signal generator; a trim motor means connectable with said amplifier and additionally operating said signal generator for preconditioning said responsive means and signal generator to changes in said condition resulting from operation of said condition control device from said operable device; motor energizing control means operated by said elastic member upon relative movement of the operable device and condition control device; and means for connecting said servo means to said condition control device and to said amplifier for maintaining a selected condition; and further means for connecting said motor energizing control means to said trim motor means to alter the selected condition.

11. In a control apparatus for operating a condition control device by an operable device and having an elastic or yielding member interconnecting said condition control device and operable device, in combination: servo means connectable in nonyielding relation to said condition control device intermediate it and the elastic member; a condition responsive means; a signal generator operated by said condition responsive means; an amplifier connected to said signal generator; a condition change compensating motor operated means connectable with said amplifier and additionally operating said signal generator for preconditioning said responsive means and signal generator to changes in said condition resulting from operation of said condition control device from said operable device; motor energizing means operated by said elastic member upon relative displacement of the operable and condition control devices; and means for connecting said servo means to said condition control device and to said amplifier for operation thereby to maintain a predetermined condition and disconnecting the compensating means from the amplifier; and further means for connecting said motor energizing means to said compensating means to effect changes from said predetermined condition.

12. In a condition control apparatus for operating the condition control device by an operable device and having an elastic member interconnecting said condition control device and operable device, in combination: servo means connectable to said condition control device through means intermediate it and the elastic means whereby said servo means may operate said two devices in parallel; a condition responsive means; a balanceable control network operated by said condition responsive means; a control means responsive to said balanceable control network; a compensating motor means connectable with said control means for operation thereby and additionally operating said network for preconditioning said responsive means and control network to changes in said condition resulting from operation of said condition control device from said operable device; motor control means operated by said elastic member upon relative displacement of the condition control and operable devices; and means for connecting said servo means to said condition control device and to said control means for operation thereby, to maintain a predetermined condition; and further means for connecting said motor control means operated by said elastic member to said compensating motor means to affect operation of said control network and a change in said predetermined condition.

13. In a control apparatus for operating a condition control device by an operable device and having means including an elastic member yieldably interconnecting said condition control device and operable device, in combination: servo means connectable in normally unyielding relation to said condition control device; a condition responsive means, a balanceable network signal generator operated by said condition responsive means; a control means connected to said signal generator for response thereto; a trim motor operated means connectable with said control means for control thereby and additionally operating said balanceable network for preconditioning said responsive means and network to changes in said condition resulting from operation of said condition control device from said operable device; trim motor control means operated by said elastic member upon relative displacement of the condition control and operable devices; means for connecting said servo means to said control means and disconnecting the control means and trim motor operated means; and means for rendering ineffective the connection between said servo means to both the control means and condition control device during operation of said trim motor from said control means.

14. In control apparatus for operating a condition control device by an operable device and having an elastic member interconnecting said condition control device and operable device, in combination: servo means connectable in normally nonyielding relation to said condition control device for movement therewith; a condition responsive means; a signal generator operated by said condition responsive means; control means for said servo means connectable to said signal generator; operable selective means for alternatively controlling said servo means from said elastic member upon relative displacement of said condition control and operable devices; and means for disabling said connection between said signal generator and control means upon operation of said operable selective means.

15. In a control apparatus for operating a condition control device by an operable device and having an elastice or resilient member interconnecting said condition control device and operable device, in combination: servo means connectable in normally nonyielding relation to said condition control device for movement therewith without lost motion; a condition responsive means; a signal generator operated by said condition responsive means; a first control means connectable with said servo means to effect operation thereof and connected to said signal generator for response thereto; limit switches operated by said servo means upon predetermined departure thereof from a normal position; operable servo means control means operated by said elastic member upon relative displacement of said condition control and operable devices; selective means for effecting control of said servo means from said operable servo means control means; and further means responsive to said limit switches and to said selective means for rendering ineffective the connection of said first control means and servo means.

16. In a control apparatus for operating a condition control device by an operable device and having an elastic member interconnecting said condition control device and operable device, in combination: servo means operating said condition control device; a voltage signal generator; voltage responsive control means connected to said signal generator; servo control means operated by said elastic member in response to relative displacement of said condition control and operable devices upon operation of said operable device; and selective means for connecting said servo control means to said servo means and disabling a connecting from said control means to said servo means.

References Cited in the file of this patent

UNITED STATES PATENTS

| | | |
|---|---|---|
| 2,232,982 | Tank | Feb. 25, 1941 |
| 2,655,327 | McGoldrick | Oct. 13, 1953 |
| 2,686,896 | Mathews | Aug. 17, 1954 |